United States Patent
Orad et al.

(10) Patent No.: US 11,210,342 B2
(45) Date of Patent: Dec. 28, 2021

(54) SYSTEM AND METHOD FOR PROVIDING IMPROVED INTERFACES FOR DATA OPERATIONS BASED ON A CONNECTIONS GRAPH

(71) Applicant: Sisense Ltd., Ramat Gan (IL)

(72) Inventors: Amir Orad, Scarsdale, NY (US); Guy Boyangu, Tel Aviv (IL); Adi Azaria, Tel Aviv (IL); Leon Gendler, Herzliya (IL)

(73) Assignee: Sisense Ltd., Ramat Gan (IL)

( * ) Notice: Subject to any disclaimer, the term of this patent is extended or adjusted under 35 U.S.C. 154(b) by 436 days.

(21) Appl. No.: 15/963,778

(22) Filed: Apr. 26, 2018

(65) Prior Publication Data

US 2018/0314764 A1    Nov. 1, 2018

Related U.S. Application Data

(60) Provisional application No. 62/491,264, filed on Apr. 28, 2017.

(51) Int. Cl.
*G06F 16/90* (2019.01)
*G06F 16/901* (2019.01)
*G06F 16/907* (2019.01)
*G06F 16/9032* (2019.01)

(52) U.S. Cl.
CPC ........ *G06F 16/9024* (2019.01); *G06F 16/907* (2019.01); *G06F 16/90328* (2019.01)

(58) Field of Classification Search
CPC . G06F 16/9024; G06F 16/907; G06F 16/0328
See application file for complete search history.

(56) References Cited

U.S. PATENT DOCUMENTS

| | | | | |
|---|---|---|---|---|
| 8,892,672 | B1* | 11/2014 | Rackliffe | H04L 51/28 709/206 |
| 9,996,535 | B1* | 6/2018 | Skidmore | G06F 16/93 |
| 2009/0018918 | A1* | 1/2009 | Moneypenny | G06Q 30/0267 705/14.73 |
| 2010/0268574 | A1* | 10/2010 | Butcher | G06Q 10/10 705/14.53 |
| 2011/0184962 | A1* | 7/2011 | Palmer | G06F 7/00 707/754 |
| 2014/0194208 | A1* | 7/2014 | Splaine | G06Q 30/02 463/42 |

(Continued)

*Primary Examiner* — Alford W Kindred
*Assistant Examiner* — Tiffany Thuy Bui
(74) *Attorney, Agent, or Firm* — M&B IP Analysts, LLC

(57) ABSTRACT

A system and method for providing an improved user interface for executing data operations. The method includes: identifying a first node and a second node, wherein the first node is selected from a first connections graph and the second node is selected from a second connections graph, wherein each node is associated with a user account having a plurality of attributes, wherein the first and second nodes share at least one common attribute; generating an influence indicator for each of the first node and the second node; identifying a data operation executed by the first node on a dataset when the influence indicator of the first node is higher than the influence indicator of the second node, wherein the identified data operation is not executed by the second node; and sending, to a device of the second node, a notification indicating the identified data operation.

15 Claims, 10 Drawing Sheets

(56) References Cited

U.S. PATENT DOCUMENTS

| | | | |
|---|---|---|---|
| 2014/0214945 A1* | 7/2014 | Zhang | H04L 67/306 |
| | | | 709/204 |
| 2016/0255034 A1* | 9/2016 | Yuan | H04L 51/22 |
| | | | 709/206 |
| 2018/0089044 A1* | 3/2018 | Guim Bernat | G06F 12/1483 |
| 2018/0196813 A1* | 7/2018 | Lin | G06Q 50/01 |
| 2019/0073411 A1* | 3/2019 | Booker | G06F 16/287 |
| 2019/0251272 A1* | 8/2019 | Ravizza | G06K 9/6223 |

* cited by examiner

SYSTEM AND METHOD FOR PROVIDING IMPROVED INTERFACES FOR DATA OPERATIONS BASED ON A CONNECTIONS GRAPH

CROSS-REFERENCE TO RELATED APPLICATIONS

This application claims the benefit of U.S. Provisional Application No. 62/491,264 filed on Apr. 28, 2017, the contents of which are hereby incorporated by reference.

TECHNICAL FIELD

The present disclosure relates generally to business intelligence systems, and more particularly to an improved interface for suggesting executable operations in data systems such as business intelligence systems.

BACKGROUND

Business Intelligence (BI) systems provide users with access to data for use in decision-making. BI systems typically handle large amounts of structured and unstructured data and provide information ready for user interpretation of big data. To this end, BI systems provide the information to users via reporting, analytics, benchmarking, data mining, and complex event processing. Access to this information is provided through a user interface, which allows users to select and execute data operations to cause generation and retrieval of BI system data. A key aspect of implementing BI systems in an organization is user acceptance, often measured as user engagement.

While BI systems improve the digestibility of big data for users, such systems still provide challenges in use due to their complexity and the vast number of permutations and combinations of data operations with different groupings of data. Although training is an important factor in implementing BI systems in an organization, many organizations offer only last-minute training that teaches users the bare minimum with respect to using the system for specific assignments. Users and, in particular, novice users, are often unsure of the operation required to perform to reach a desired result. Thus, such users may need to navigate potential data operation options before arriving at a suitable result. This navigation may be slow and complex, particularly for newer users, thereby resulting in decreased user engagement.

While BI systems feature complex datasets, many operations performed by users of BI systems may be similar when two users work on the same or similar datasets. For example, two users working on datasets including sales data over a year may both execute an operation for generating a report for the year.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing an improved user interface for executing data operations. The method comprises: identifying a first node and a second node, wherein the first node is selected from a first connections graph including a first plurality of nodes, wherein the second node is selected from a second connections graph including a second plurality of nodes, wherein each node is associated with a user account having a plurality of attributes, wherein the identified first and second nodes share at least one common attribute; generating, based on the first connections graph and the second connections graph, an influence indicator for each of the first node and the second node; identifying a data operation executed by the first node on a dataset when the influence indicator of the first node is higher than the influence indicator of the second node, wherein the identified data operation is not executed by the second node; and sending, to a device of the second node, a notification indicating the identified data operation, wherein the device is configured to display a user interface including the identified data operation.

Certain embodiments disclosed herein also include a non-transitory computer readable medium having stored thereon causing a processing circuitry to execute a process, the process comprising: identifying a first node and a second node, wherein the first node is selected from a first connections graph including a first plurality of nodes, wherein the second node is selected from a second connections graph including a second plurality of nodes, wherein each node is associated with a user account having a plurality of attributes, wherein the identified first and second nodes share at least one common attribute; generating, based on the first connections graph and the second connections graph, an influence indicator for each of the first node and the second node; identifying a data operation executed by the first node on a dataset when the influence indicator of the first node is higher than the influence indicator of the second node, wherein the identified data operation is not executed by the second node; and sending, to a device of the second node, a notification indicating the identified data operation, wherein the device is configured to display a user interface including the identified data operation.

Certain embodiments disclosed herein also include a system for providing an improved user interface for executing data operations. The system comprises: a processing circuitry; and a memory, the memory containing instructions that, when executed by the processing circuitry, configure the system to: identify a first node and a second node, wherein the first node is selected from a first connections graph including a first plurality of nodes, wherein the second node is selected from a second connections graph including a second plurality of nodes, wherein each node is associated with a user account having a plurality of attributes, wherein the identified first and second nodes share at least one common attribute; generate, based on the first connections graph and the second connections graph, an influence indicator for each of the first node and the second node; identify a data operation executed by the first node on a dataset when the influence indicator of the first node is higher than the influence indicator of the second node, wherein the identified data operation is not executed by the second node; and send, to a device of the second node, a notification indicating the identified data operation, wherein the device is configured to display a user interface including the identified data operation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
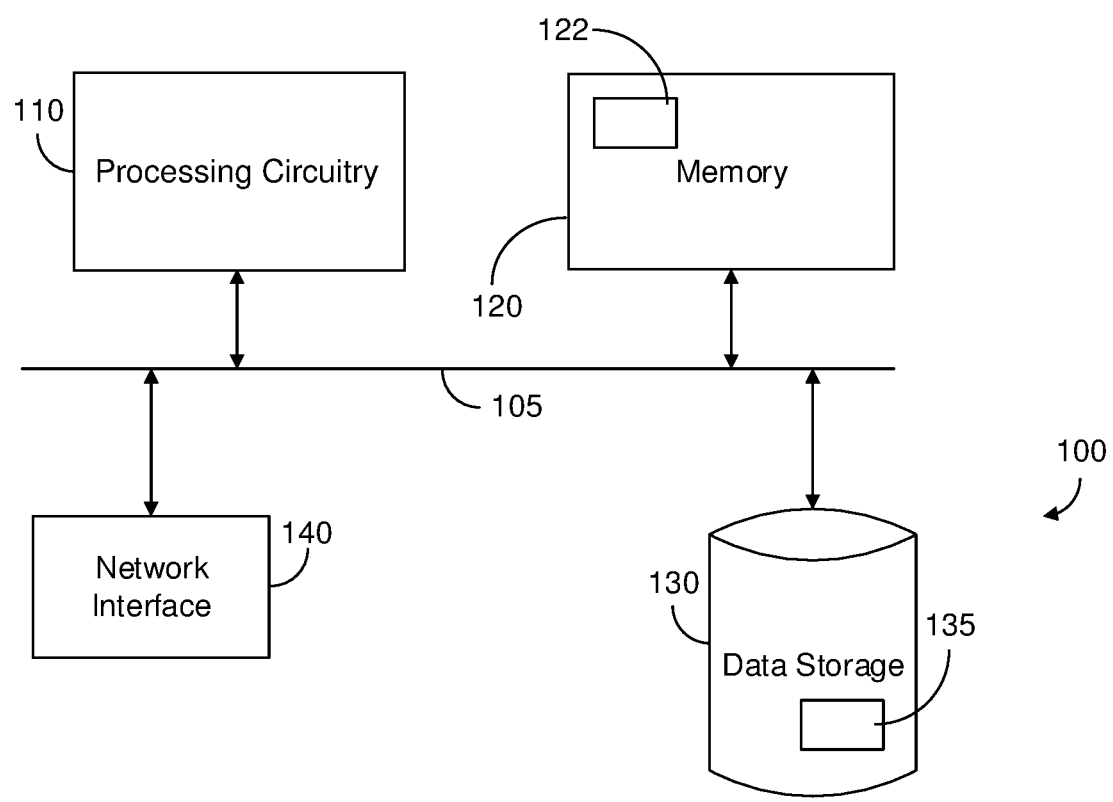
FIG. 1 is a schematic diagram of a business intelligence (BI) system according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing improved interfaces for data operations. The dataset may be stored in a system such as a business intelligence (BI) system that allows for data operations such as BI operations for accessing data. A first connections graph is received. The first connections graph includes a first plurality of nodes. A second connections graph is received. The second connections graph includes a second plurality of nodes. Each node corresponds to a user account of a BI system that has attributes. A first node and a second node are selected from the first connections graph and the second connections graph, respectively. The respective user accounts of the first and second nodes share one or more attributes. An influence indicator is determined for each of the first node and the second node. The influence indicator may be determined based on parameters such as, but not limited to, a number of ingoing connections, a number of outgoing connections, and the like. A notification suggesting a data operation executed by the first node but not by the second node is sent to the second node when the influence indicator of the first node is greater than that of the second node.

The suggested operations may be incorporated into user interfaces of BI systems, thereby providing improvements to such user interfaces. Specifically, the suggestions allow for reducing complexity and increasing speed of user interactions with the BI system by reducing navigation among options of data operations. Accordingly, various disclosed embodiments increase user efficiency and engagement vis-à-vis a BI system and, in particular, a user interface for interacting with the BI system.

FIG. 1 is an example schematic illustration of a BI system 100 according to an embodiment.

The BI system 100 includes a processing circuitry 110. In an embodiment, the processing circuitry 110 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry 110 is coupled via a bus 105 to a memory 120.

The memory 120 may include a memory portion 122 containing instructions that, when executed by the processing circuitry 110, configures the processing circuitry to perform one or more of the embodiments described herein. The memory 120 may be further used as a working scratch pad for the processing circuitry 110, a temporary storage, and others, as the case may be. The memory 120 may be a volatile memory such as, but not limited to, random access memory (RAM), or a non-volatile memory (NVM) such as, but not limited to, Flash memory.

The processing circuitry 110 may be coupled to a network interface 140. The network interface 140 may provide connectivity to a network (not shown). In an embodiment, the network may be configured to provide connectivity of various sorts, as may be necessary, including but not limited to, wired connectivity, wireless connectivity, or both. The network may be, for example, local area network (LAN), wide area network (WAN), metro area network (MAN), worldwide web (WWW), Internet, a cellular network, and any combination thereof.

The processing circuitry 110 may be further communicatively connected to a data storage 130. The storage 130 may be magnetic storage, optical storage, and the like, and may be realized, for example, as flash memory or other memory technology, CD-ROM, Digital Versatile Disks (DVDs), or any other medium which can be used to store the desired information. The data storage 130 may store instructions for configuring the processing circuitry 110 to perform the disclosed method embodiments. The data storage 130 may include a storage portion 135 containing a dataset generated by the BI system 100 based on data from a plurality of databases (e.g., the databases 210, FIG. 2). The databases may be accessed by the BI system 100 via the network interface 140.

The processing circuitry 110, the memory 120, or both, may also include machine-readable media for storing software. Software shall be construed broadly to mean any type of instructions, whether referred to as software, firmware, middleware, microcode, hardware description language, or otherwise. Instructions may include code (e.g., At Source code format, binary code format, executable code format, or any other suitable format of code). The instructions, when executed by the one or more processors, cause the processing circuitry 110 to perform the various embodiments disclosed herein.

Figure 2:
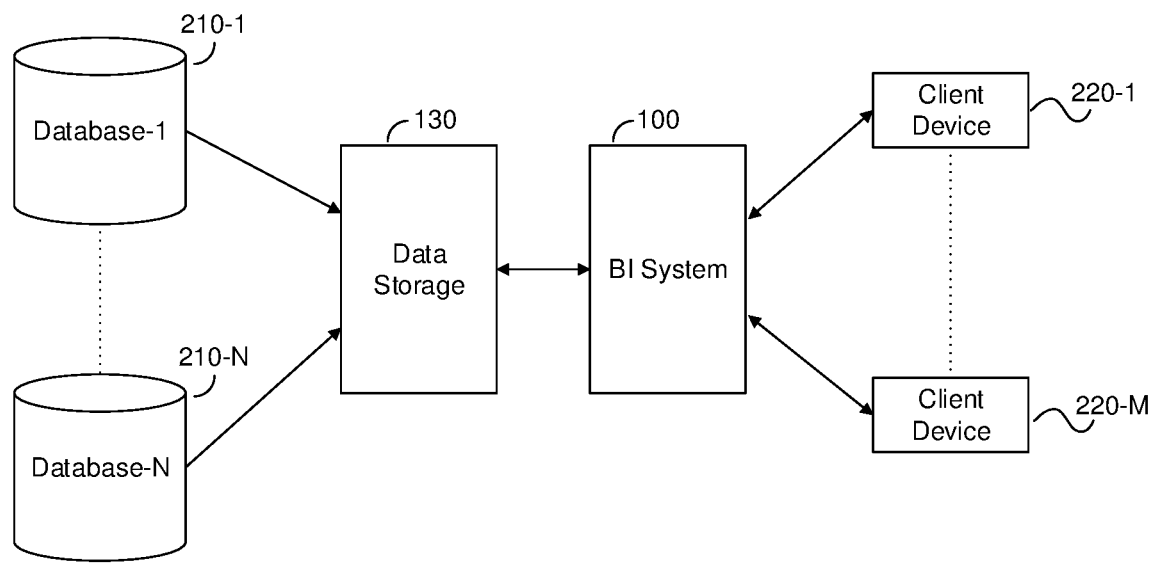
FIG. 2 is a communications diagram utilized to describe various disclosed embodiments.

FIG. 2 is an example communications diagram 200 utilized to describe various disclosed embodiments. Databases 210-1 through 210-N(N is an integer greater than or equal to 1), generally referred to as databases 210 are communicatively connected to a data storage 130. The data storage 130 is configured to store one or more datasets generated by the BI system 100. The one or more datasets may be used by the BI system 100 to generate responses to queries, supply information to a dashboard, and the like. For example, the BI system 100 may be configured to generate key performance indicators (KPI), key quality indicators (KQI), statistical analysis reports, and the like. The BI system 100 may be further configured to generate an enriched dataset based on one or more of the stored datasets.

The BI system 100 is further communicatively connected to a plurality of client devices 220-1 through 220-M (M is an integer greater than or equal to 1), hereinafter referred to individually as a client device 220 or collectively as client devices 220. The BI system 100 is accessible to a user account through a client device 210. In an embodiment, certain user accounts may be permitted to access only certain datasets or portions thereof, for example according to a security policy. User accounts may be arranged in a hierarchy, which may or may not indicate a formal position of a user associated with the user account with respect to an organization or company. Each user account may be authorized to perform certain operations on datasets stored in the data storage 130 which are accessible to the user account. One or more such operations may cause generation of an enriched dataset. In the example communications diagram 200, any of the components may communicate over one or more networks (not shown).

Figure 3:
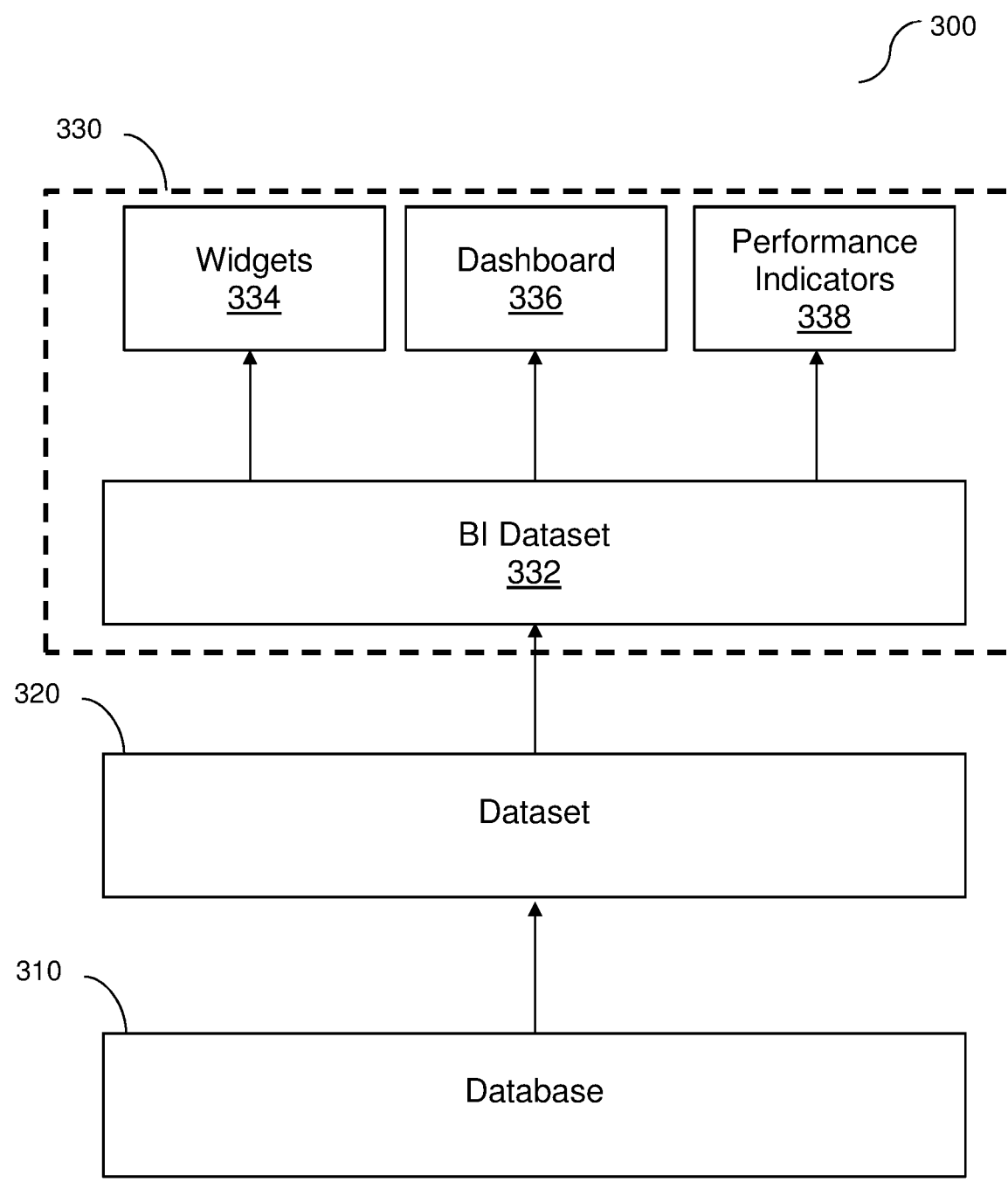
FIG. 3 is a schematic diagram illustrating data layers of a BI system according to an embodiment.

FIG. 3 is an example schematic diagram 300 illustrating data layers of a BI system according to an embodiment. A BI system (e.g., the BI system 100, FIG. 1) may provide a user of a user device (e.g., one of the client devices 220, FIG. 2) with insights derived from a plurality of data sources. A first data layer 310 may include databases and data warehouses, such as the databases 210, FIG. 2.

A second data layer 320 may include a dataset generated by the BI system. The dataset may include tables, graphs, and the like. In an example implementation, the dataset may be utilized for generating reports, dashboards, widgets, performance indicators, and the like.

A third data layer 330 includes a BI dataset 332. The BI dataset 332 is an enriched dataset, which may be generated as a result of operations, instructions, or both, received from a user account through a client device (e.g., the client device 210, FIG. 2). In an embodiment, the third data layer 330 includes one or more widgets 334, a dashboard 336, and one or more performance indicators 338. In an example implementation, the BI dataset 332 may be generated by the BI system 100 by performing queries, operations, or both, on the dataset of the second data layer 320.

Figure 4A:
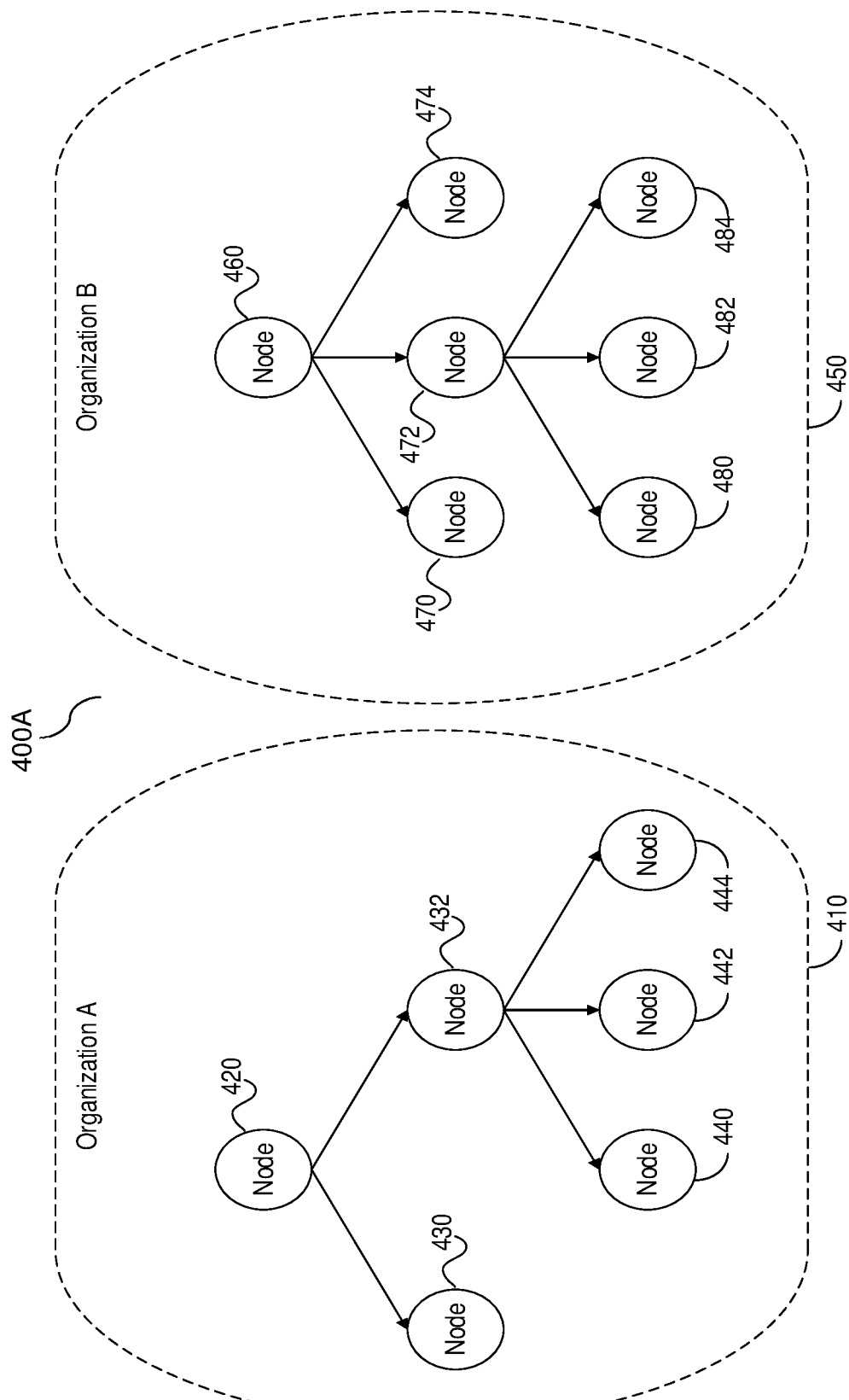
FIGS. 4A through 4C are schematic illustrations of connections structures.

FIG. 4A is an example schematic illustration of a user account hierarchical structure 400A for configuring access to one or more datasets of a BI system according to an embodiment. Organization A 410 includes three levels of user accounts, hereinafter referred to as nodes. In an example implementation, a node in a level higher than a second node may be able to access datasets, or portions thereof, which the second node is not able to access.

Similarly, operations, instructions, or both, to be performed on one or more datasets may be limited based upon the level of the node in the hierarchy.

Organization A 410 includes one primary node 420, which is connected to a first secondary node 430 and a second secondary node 432. The second secondary node 432 is further connected to a first tertiary node 440, a second tertiary node 442, and a third tertiary node 444.

Organization B 450 includes one primary node 460, which is connected to a first secondary node 470, a second secondary node 472, and a third secondary node 474. The second secondary node 472 is further connected to a first tertiary node 480, a second tertiary node 482, and a third tertiary node 484.

Each node may include metadata related to the user account such as, but not limited to, name, job title, seniority, department, and the like. In certain embodiments, the BI system may have access to a resume (curriculum vitae) of a user of a user account, and may be configured to extract information from such a resume, for example in the form of keywords such as previous job titles, areas of expertise, skills, and the like. The extracted information may be used together with the metadata. A user account may be further associated with one or more data operations which were instructed to be executed by the user account.

Figure 4B:
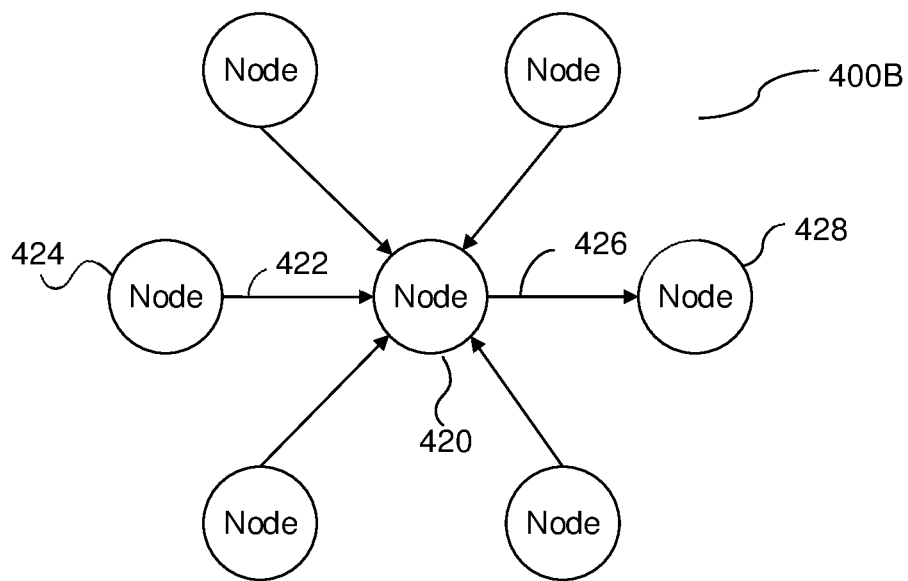

FIG. 4B is an example schematic illustration of a connections structure 400B of a primary node of organization A 410 according to an embodiment. A primary node 420 is connected to 6 nodes including a first node 424 and a second node 428. In an embodiment, a connections structure may include ingoing connections and outgoing connections. In some implementations, a connection is only formed when two nodes agree to connect.

A first node may initiate contact to a second node, for example by sending a request to connect. In the example connections network structure 400B, an ingoing connection 422 between the first node 424 and the primary node 420, indicates that the first node 424 initiated the connection to the primary node 420. An outgoing connection 426 between the second node 428 and the primary node 420 indicates that the primary node 420 initiated the connection to the second node 428.

The directions of the connections may indicate the influence ability of a user associated with the user account of each node. For example, with respect to the primary node 420 has 5 ingoing connections including the ingoing connection 422 and 1 outgoing connection 426. This ratio may indicate that the user represented by primary node 420 is a highly requested connection for other users. Such a primary node 420 may, for example, hold a high degree of influence over their connections.

Figure 4C:
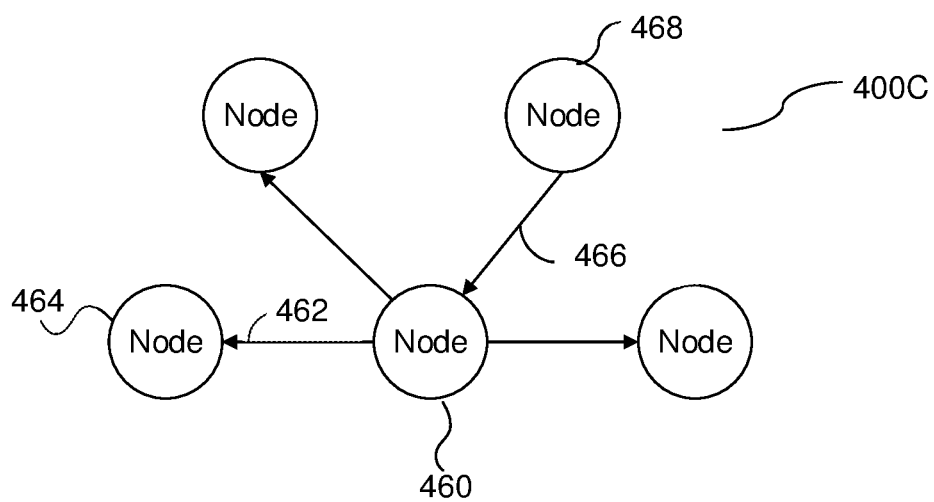

FIG. 4C is an example schematic illustration of a connections network structure 400C of a primary node 460 of Organization B 450 according to an embodiment. A primary node 460 is connected to 4 nodes including a first node 464 and a second node 468. One connection is an ingoing connection 466 and three are outgoing connections including a connection 462 to the first node 464.

The primary node 460 may include metadata indicating a title, job title, and the like, which are similar to those of primary node 420 of Organization A 410. The two primary nodes 420 and 460 are comparable, however, it is possible to conclude that the primary node 420 has more influence over their connections than the primary node 460 based on, for example, the higher ratio of ingoing connections to outgoing connections of primary node 420 as compared to primary node 460. For example, an influence indicator may be generated based on a weight and value for the ratio of incoming/outgoing connections. All else held equal (i.e., assuming that other parameters used for generating the influence indicator are equal), the primary node 420 is determined to have a higher influence indicator and, therefore, the primary node 420 has more influence over their connections than the primary node 460.

It should be noted that FIGS. 4B and 4C demonstrate connections with respect to a primary node 420 or 460 merely for simplicity purposes, and that the nodes connected to the primary nodes 420 and 460 may further have connections to other nodes without departing from the scope of the disclosure.

Figure 5:
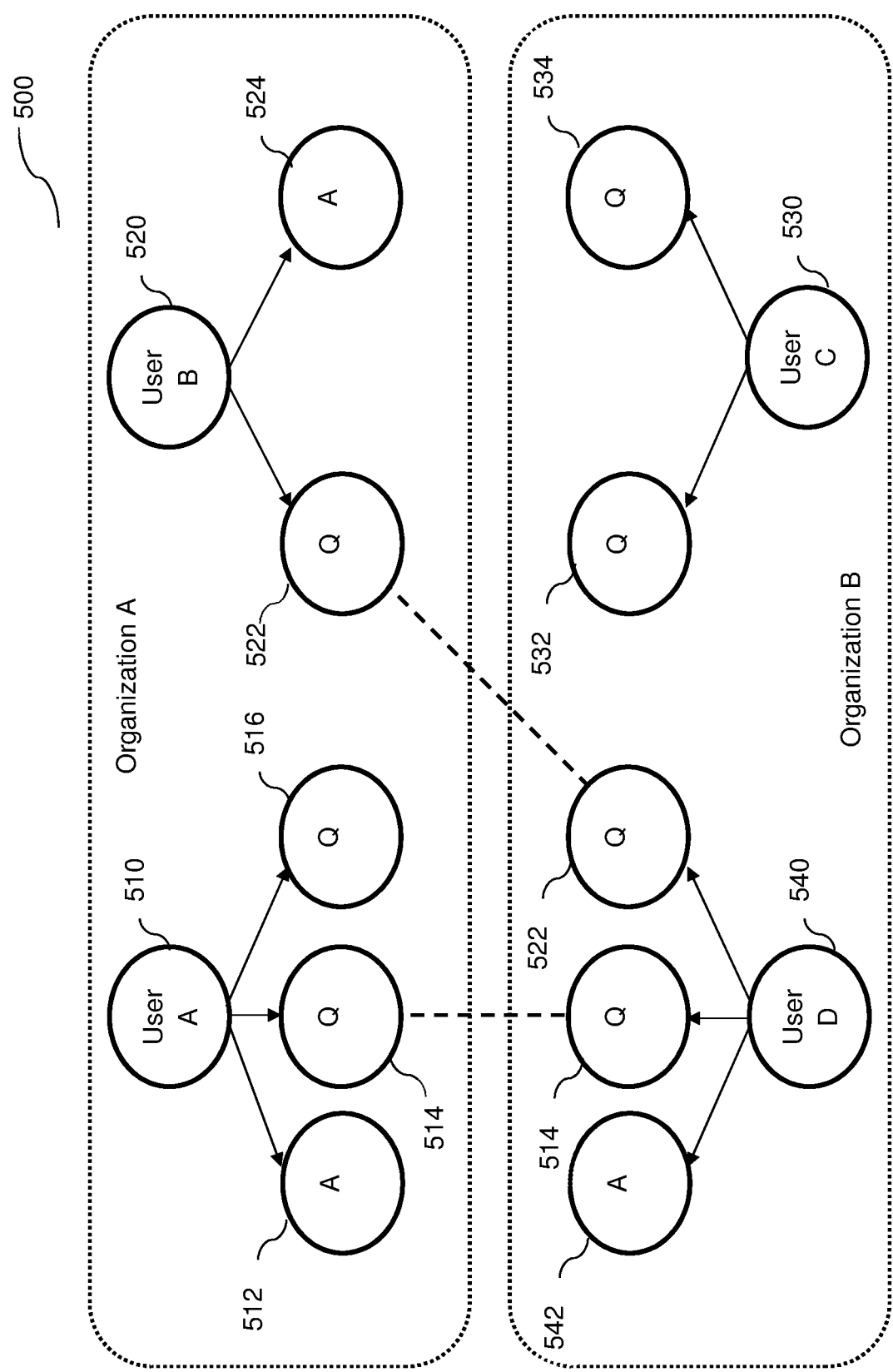
FIG. 5 is a schematic illustration of user accounts and associated actions.

FIG. 5 is an example schematic illustration 500 of user accounts and associated queries and actions within different organizations according to an embodiment. First organization A includes user accounts UserA 510 and UserB 520. User account UserA 510 includes actions and queries generated or used by the user account such as action 512, query 514 and query 516. User account UserB 520 includes query 522 and action 524. An action may be, for example, generating a report.

Organization B includes user account UserC 530, which has query 532 and query 534. Organization B further includes user account UserD 540, which includes action 542, the query 514 and query 522. The query 514 and 522 are common between the UserD 540 with UserA 510 and with UserB 520, respectively. In an embodiment, queries and actions common to users between organizations or within an organization can be used to determine the influence indicator. For example, UserD 540 may receive data operation recommendations generated from UserA 510 and UserB 520, as they each have common queries with UserD 540.

Figure 6:
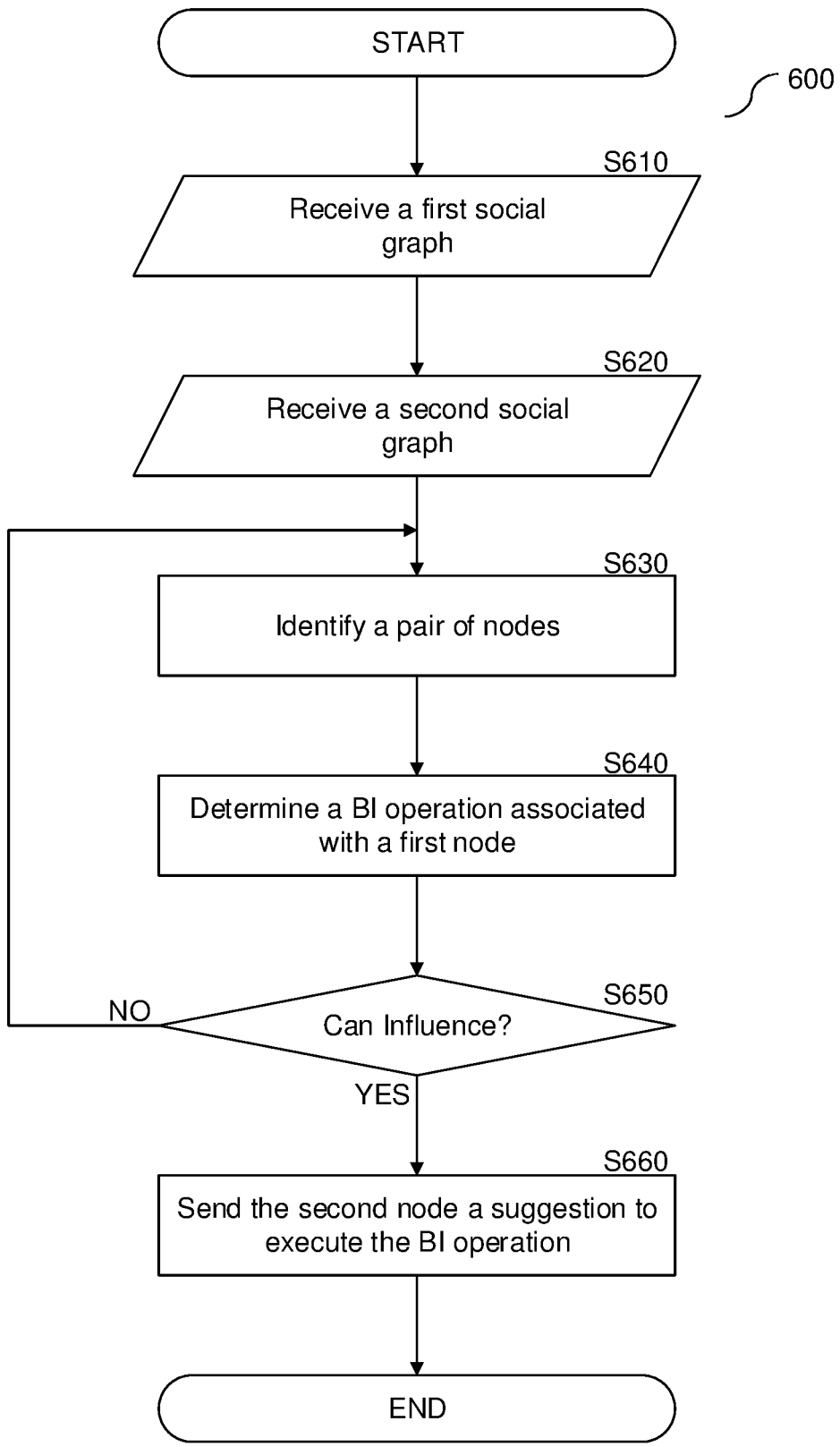
FIG. 6 is a flowchart illustrating a method for suggesting data operations according to an embodiment.

FIG. 6 is an example flowchart 600 illustrating a method for suggesting data operations, implemented in accordance with an embodiment. In an embodiment, the method is performed by the BI system 100.

At S610, a first connections graph is received. The first connections graph includes a first plurality of nodes, each node corresponding to a user account of the BI system 100. A user account may include attributes, which may be stored as metadata. In an embodiment, the BI system may receive a hierarchical structure, the hierarchical structure including another plurality of nodes, such that at least a portion of the nodes of the hierarchical structure correspond to nodes of the connections graph.

At S620, a second connections graph including a second plurality of nodes is received, each node corresponding to a user account of the BI system 100. In an embodiment, the first connections graph and the second connections graph may each be a portion of the same primary connections graph, having a single hierarchical structure.

Each connections graph is a representation of the connections between users, where each user is represented as a node of the graph. A connections graph may be generated for each user, detailing who they are connected to. Any digital interaction may be used to create a connection, for example, exchange of emails between two or more people, accessing digital calendars to identify meetings which people attend together, and the like. A hierarchical structure is a representation of the hierarchical connections between people (e.g., management versus employees, upper level management versus lower level management, etc.).

In an embodiment, S610, S620, or both, may include generating a connections graph instead of receiving it. For example, a hierarchical structure including names and titles of employees in an organization may be received. Accessible databases, online connections, and the like, are searched and utilized to generate the connections graph. In a further embodiment, connections within the connections graph may be probabilistic by nature. In one such example, the hierarchy of Organization A may have a CEO with a common name, such as Jane Smith. While there may be many such user accounts on connections, only a handful may have a probability higher than a predefined threshold to be the CEO. In this example, the system may assign an 80% probability that Jane Smith, age 42, with an MBA (indicated by metadata of a user node associated with MBA holder Jane Smith), is the CEO of Organization A, as opposed to a 20% probability that Jane Smith, age 26, recent college graduate (indicated by metadata of a user node associated with recent college graduate Jane Smith), is the CEO.

At S630, a pair of nodes sharing one or more attributes is identified. The pair of nodes includes a first node identified from the first connections graph and a second node identified from the second connections graph. The pair of nodes may be selected randomly, based on a current need (for example, when the second node is accessing the BI system), and the like. In some implementations, different first nodes may be selected for each second node at each iteration of the method, so as to provide diversity of sources, even though some of the sources may have a low indication of connections influence.

At S640, a data operation associated with the first node but not with the second node is determined. The data operation may be, for example but not limited to, generation of a key performance indicator (KPI), generation of a report, execution of one or more queries, a combination thereof, and the like. The determined data operation was performed by a user associated with the first node.

At S650, based on the first connections graph and the second connections graph, it is determined if the first node is an influencer of the second node and, if so, execution continues with S660; otherwise, execution continues with S630. For example, the primary node 420 has a higher influence indicator than primary node 460 (for example, as described herein above with respect to FIGS. 4A-4C) and, therefore, may be determined as an influencer of the second node. The determination may be based on the ratio of ingoing and outgoing connections, a number of ingoing or outgoing connections exceeding a threshold, combinations thereof, and the like.

In an embodiment, S650 may include generating one or more influence indicators, which may be a numerical value indicating the relative influence of one node on another. In an example implementation, the influence indicators may be generated based on, but not limited to, number of ingoing connections, number of outgoing connections, and the like. In some implementations, generating the influence indicators may include assigning weighted scores to values used for generating the influence indicators.

The influence indicators may include relative values and absolute values. A relative value may be, for example, within the field of expertise of the person. An absolute value may be, for example, across fields which are not connected. As an example, the President of the United States holds influence which carries across many fields, as opposed to a CTO of a Fortune 500 company, whose influence is typically limited to their field. Thus, for a user that is not in the field of the CTO, the President of the United States may have a higher absolute influence indicator.

In a further embodiment, each influence indicator may be compared to a threshold. If the influence indicator is not above the threshold, the first node may not be determined to be an influencer of the second node. This may be utilized to prevent data operations executed by non-influential nodes from being suggested. Different thresholds may be utilized for different types of influence indicators, for example relative values versus absolute values. For example, the threshold for an influencer based on an absolute value may be higher than the threshold for a relative value because the susceptibility of a user to be influenced by a user outside of their field is less likely.

At S660, when it is determined that the first node is an influencer of the second node, a notification is sent to a device associated with the second node. The device may be a user device such as, but not limited to, a desktop computer, a laptop computer, a tablet computer, a smartphone, and the like. The notification includes a suggestion to execute the data operation executed by the first node. In an embodiment, the notification may include sending, to the device associated with second node, metadata of the first node. The probability of the user adopting the suggested data operation may be higher when the suggestion originates from an influencing node. The notification is displayed as part of a user interface for interacting with the BI system, thereby providing a user of the BI system with immediate options for engaging with the BI system. The display may include a visual display, an audio queue, both, and the like.

In an embodiment, S660 may further include sending a notification indicating a recommendation for changing access permissions. The notification indicating an access permission recommendation may be sent as part of or in addition to the suggested data operation notification. In a further embodiment, the recommended access permission may be an access permission that is needed for execution of the suggested data operation by the second node such that implementing the recommended change in access permission allows for execution of the suggested data operation. An example method for generating data access permission recommendations that may be sent in a notification is described with respect to FIG. 7.

In some implementations, S660 may further include receiving feedback on whether a suggestion was implemented or not. The influence indicators of the first node with respect to the second node may be refined based on the feedback.

It should be noted that the order of steps described with respect to FIG. 6 may differ in some embodiments. For example, in an embodiment, execution may continue from S630 to S650, and execution may proceed from S650 to S640 when it is determined that the first node is an influencer of the second node. In such an example, execution may proceed from S640 to S660.

It should be noted that the method of FIG. 6 may be iteratively performed. The iterations may be performed successively, concurrently, or both.

Figure 7:
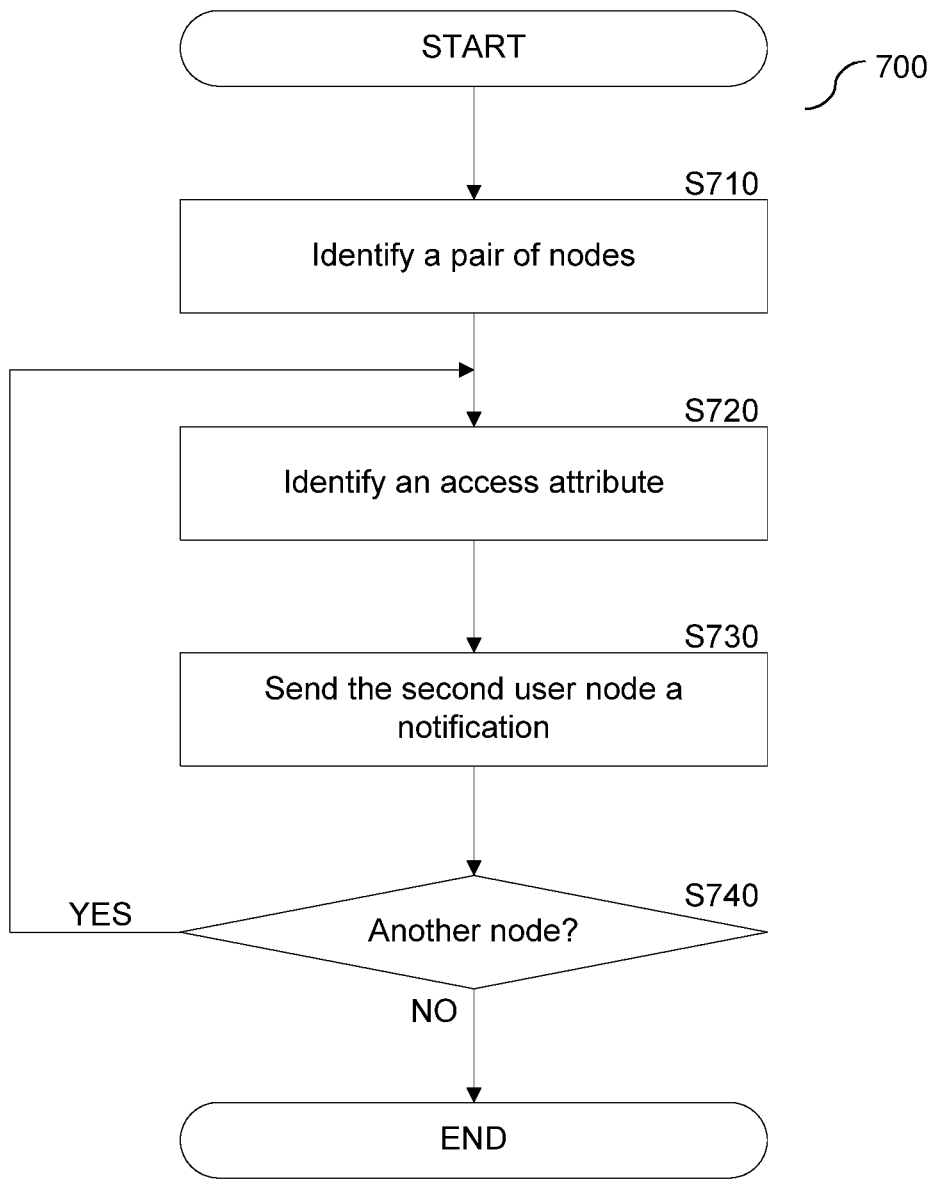
FIG. 7 is a flowchart illustrating a method for generating data access permission recommendations according to an embodiment.

FIG. 7 is an example flowchart 700 illustrating a method for generating data access permission recommendations according to an embodiment.

At S710, a pair of nodes is identified. The pair of nodes includes a first node from a first connections graph of a first organization and a second node from a second connections graph of a second organization. In an embodiment, the first node is an influencer of the second node as described herein above with respect to FIG. 6. The first organization and the second organization have a database, a dataset, or both, that is similar.

In an embodiment, two databases or datasets are similar if they describe the same type of data. For example, human resources data (such as employee names, department names, salary figures, etc.) may be stored in a variety of databases and structures thereof, and each would describe comparable underlying data.

The first node has a first subset node which is at a hierarchical level lower than the first node, and the second node has a second subset node which is a hierarchical level lower than the second node. For example, the first node may be associated with a chief marketing officer, and the first subset node may be a regional marketing manager. The first node, the second node, or both, may have a plurality of subset nodes. Each subset node may itself have one or more subset nodes that are a hierarchical level lower, and so on.

At S720, one or more access permissions of the first subset node is identified. The access permissions include permissions to view a portion (e.g., a dataset or portion thereof) of a database.

For example, the second organization may have a plurality of regional marketing managers, each able to access sales data only of their respective regions. In contrast, the first organization, which also has a plurality of regional marketing managers, allows each regional marketing manager to access all sales data. Each node may have the privilege to change the access permissions of its respective subset nodes. For example, a node of a manager may grant permission to a node of the manager's employee to access data which the manager has permission to access.

At S730, a notification is sent to the second node to suggest changing the access permission of one or more of its respective subset nodes. Changing may be allowing a broader, or narrower, access of data. In an embodiment, the notification may include a request to change the access permission, and providing a response framework, so that the node can authorize (or decline) the change, and then instructing, for example a BI System, to implement the change in access permission for the subset nodes.

At S740, it is checked if another subset node should be identified and, if so, execution continues at S720; otherwise execution terminates.

Figure 8:
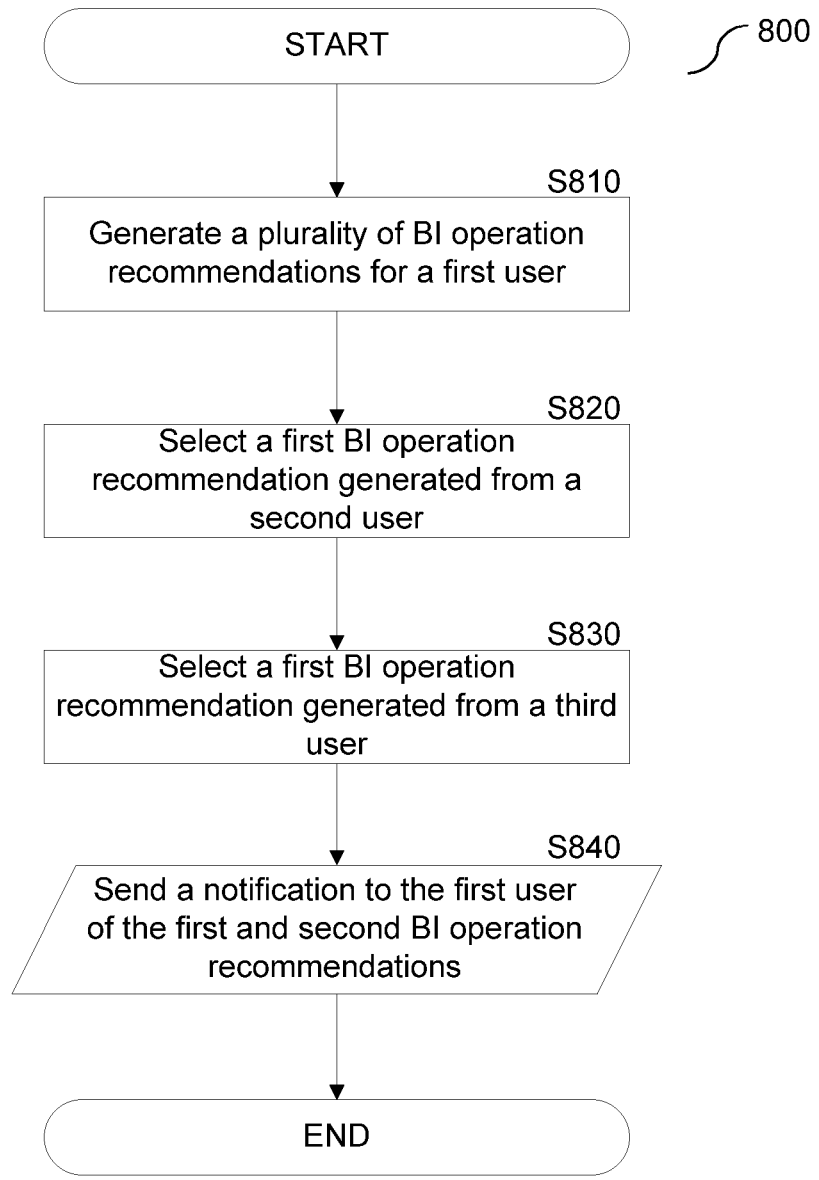
FIG. 8 is a flowchart illustrating a method for providing a user with suggested data operations according to an embodiment.

FIG. 8 is an example flowchart illustrating a method for providing a user with suggested data operations according to an embodiment.

At S810, a plurality of data operation recommendations is generated for a first node, for example as described herein above with respect to FIG. 6. A recommended data operation may include, but is not limited to, generating a report, generating a KPI, generating a widget, generating a query, and the like.

At S820, a first data operation associated with a second node is selected as a first recommendation from among the generated data operation recommendations. At S830, a second data operation recommendation associated with a third node is selected. Each selected data operation may be, for example, a data operation that was executed by a user of the respective associated node. For example, the first data operation is a generation of a KPI by a user of the second node. In some embodiments, multiple data operation recommendations may be selected at S820, S830, or both.

In an embodiment, the second and third nodes for which data operations are to be selected may be determined based on influence indicators associated with nodes with respect to the first node. In a further embodiment, data operations are selected from the node(s) having the highest influence indicators for the first node. In yet a further embodiment, some of the generated recommendations will not be provided to the first node even if those recommendations are associated with a node having higher influence with respect to the first node. This may allow for, e.g., preventing a single user node from becoming over-influential, resulting in receiving suggested operations only from that single user node. Due to the diversity in user nodes from which recommendations are determined, user interface engagement may increase.

In an embodiment, the data operation recommendations selected at S820 and S830 may include data operations of different operation types, associated with different nodes, combinations thereof, and the like. This may have a benefit of providing a user with a suggestion feed which is diverse, thereby again increasing likelihood of engagement.

At S840, a notification is sent to the first node. The notification indicates at least the first and second BI recommendations. In an embodiment, the notification may be sent to a feed (e.g. a queue of suggestions, notifications, etc.) accessible to the first node. In an example implementation, the notification includes a menu (i.e., a mix) of data operation recommendations.

As a non-limiting example, for a BI system accessible to a first node of Alice, a second node of Bob, a third node of Charlie, and a fourth node of Danielle. Bob has the highest influence indicator with respect to Alice, Charlie has the middle value, and Danielle has the lowest. Data operation recommendations are determined for the first node of Alice based on data operations executed by the respective nodes of Bob, Charlie, and Danielle. A first data operation that was executed by Bob's node is selected because Bob's node has the highest influence indicator with respect to Alice. However, instead of all data operations being selected from among the data operations executed by Bob's node, a second data operation that was executed by Charlie's node (the second highest influence indicator among the other nodes) is selected in order to create a diverse suggestion feed for Alice.

In some embodiments, a portion of the suggestions may be allocated to one or more type of data operation. To this end, some selected recommendations may be from nodes having lower influence indicators in order to allow for selection of different types of data operation recommendations. For example, recommended data operations may include generating a KPI executed by Bob, generating a query executed by Charlie, and generating a report executed by Charlie. In some implementations, feedback may be received from first the node after it receives the recommended data operation. For example, if a user of the first node declined to accept the recommendation generated from the second user, the influence indicator of the second user (relatively, or globally) may be adjusted accordingly. In this case, because the first node did not demonstrate that it was influenced by the second node, the influence indicator may be decreased.

It should be noted that FIG. 8 is described with respect to selecting among recommendations of data operations associated with a second node and a third node merely for example purposes, and that data operation recommendations from more nodes may be equally selected, with one or more data operation recommendations being selected from each node.

Figure 9:
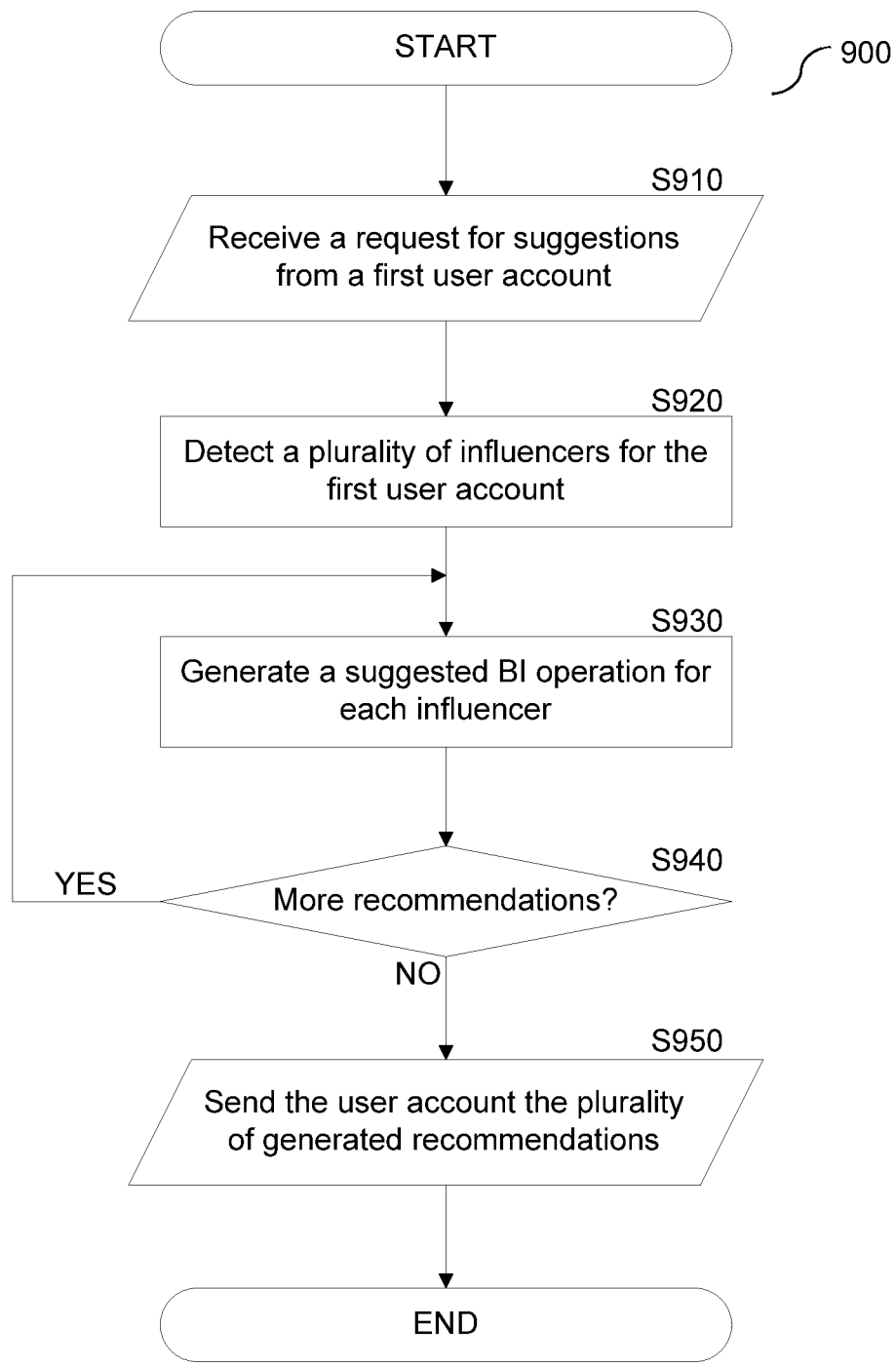
FIG. 9 is a flowchart illustrating a method for providing a user account with suggested data operations according to an embodiment.

FIG. 9 is an example flowchart illustrating a method for providing a user account with suggested data operations according to an embodiment.

At S910, a request is received from a first user account (such as UserD 540 of FIG. 5) to generate suggestions for data operations. In an embodiment, the request may be received by a BI system as a BI system operation At S920, a plurality of influencers are determined for the first user account. Influencers may be user accounts which are associated with nodes which executed data operations and have at least a common trait (such as job title, job description, etc.), a common action (running a query, for example), or both, with respect to the first user account.

At S930, a data operation suggestion is generated with respect to each of at least a first influencer and a second influencer of the first user account. The first and second influencers may include connections of the first user account having influence indicators above a threshold with respect to a node associated with the first user account determined as described with respect to FIG. 6.

At S940, it is determined if additional suggestions may be generated from the first influencer, the second influencer, or both. If so, execution continues at S930; otherwise, execution continues at S950. In an example implementation, additional suggestions may be generated when multiple Data operations were performed by one of the influencers, for example, on the same type of data or on a similar dataset.

At S950, the first user account is sent the generated data operation suggestions. In an embodiment, S950 includes sending a notification indicating the recommendations.

The data operation suggestions may be displayed on the node upon receipt of the notification.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element At Some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing an improved user interface for executing data operations, comprising:
   identifying a first node and a second node, wherein the first node is selected from a first connections graph including a first plurality of nodes, wherein the second node is selected from a second connections graph including a second plurality of nodes, wherein each node is associated with a user account having a plurality of attributes, and wherein the identified first and second nodes share at least one common attribute;
   generating, based on the first connections graph and the second connections graph, an influence indicator for each of the first node and the second node, wherein each influence indicator generated for a node is generated based on a ratio of number of ingoing connections of the respective connections graph of the node and a number of outgoing connections of the respective connections graph of the node or based on a weight and value for a ratio of ingoing connections to outgoing connections of the node;
   identifying a data operation executed by the first node on a dataset when the influence indicator of the first node is higher than the influence indicator of the second node, wherein the identified data operation is not executed by the second node, wherein the identified data operation, when executed, results in obtaining business intelligence system data; wherein execution of the identified data operation includes at least one of generating and retrieving the business intelligence system data;
   generating a plurality of data operation recommendations including a recommendation for executing the identified data operation;
   selecting at least two data operation recommendations including the recommendation for executing the identified data operation; and
   sending, to a device of the second node, a notification indicating the identified data operation, wherein the device is configured to display a user interface including the identified data operation, wherein the notification indicates the selected at least two data operation recommendations.

2. The method of claim 1, wherein the influence indicator is generated based further on a hierarchical structure including a third plurality of nodes, wherein the hierarchical structure of the third plurality of nodes includes at least one node that is common to the first plurality of nodes and the second plurality of nodes.

3. The method of claim 2, further comprising: generating a primary connections graph based on the hierarchical structure, wherein the first connections graph and the second connections graph are subsets of the primary connections graph.

4. The method of claim 1, wherein the attributes include at least one of: first name, family name, position title, and supervisor identifier.

5. The method of claim 1, wherein the identified data operation includes at least one of: generating a dataset, generating a key performance indicator, generating a report, generating a query, and generating a widget.

6. The method of claim 1, wherein the first node has a connection to at least one first subset node and the second node has a connection to at least one second subset node, each subset node having an access permission, wherein the notification further includes a recommendation to change the access permission of at least one of the at least one second subset node based on the access permission of at least one of the at least one first subset node.

7. The method of claim 1, wherein the notification further includes metadata of the first node.

8. A non-transitory computer readable medium having stored thereon instructions for causing a processing circuitry to execute a process, the process comprising:
   identifying a first node and a second node, wherein the first node is selected from a first connections graph including a first plurality of nodes, wherein the second node is selected from a second connections graph including a second plurality of nodes, wherein each node is associated with a user account having a plurality of attributes, and wherein the identified first and second nodes share at least one common attribute;
   generating, based on the first connections graph and the second connections graph, an influence indicator for each of the first node and the second node, wherein each influence indicator generated for a node is generated based on a ratio of number of ingoing connections of the respective connections graph of the node and a number of outgoing connections of the respective connections graph of the node or based on a weight and value for a ratio of ingoing connections to outgoing connections of the node;
   identifying a data operation executed by the first node on a dataset when the influence indicator of the first node is higher than the influence indicator of the second node, wherein the identified data operation is not executed by the second node, wherein the identified data operation, when executed, results in obtaining business intelligence system data; wherein execution of the identified data operation includes at least one of generating and retrieving the business intelligence system data;
   generating a plurality of data operation recommendations including a recommendation for executing the identified data operation;
   selecting at least two data operation recommendations including the recommendation for executing the identified data operation; and
   sending, to a device of the second node, a notification indicating the identified data operation, wherein the device is configured to display a user interface including the identified data operation, wherein the notification indicates the selected at least two data operation recommendations.

9. A system for providing an improved user interface for executing data operations, comprising:
   a processing circuitry; and a memory, the memory containing instructions that, when executed by the processing circuitry, configure the system to:

identify a first node and a second node, wherein the first node is selected from a first connections graph including a first plurality of nodes, wherein the second node is selected from a second connections graph including a second plurality of nodes, wherein each node is associated with a user account having a plurality of attributes, and wherein the identified first and second nodes share at least one common attribute;

generate, based on the first connections graph and the second connections graph, an influence indicator for each of the first node and the second node, wherein each influence indicator generated for a node is generated based on a ratio of number of ingoing connections of the respective connections graph of the node and a number of outgoing connections of the respective connections graph of the node or based on a weight and value for a ratio of ingoing connections to outgoing connections of the node;

identify a data operation executed by the first node on a dataset when the influence indicator of the first node is higher than the influence indicator of the second node, wherein the identified data operation is not executed by the second node, wherein the identified data operation, when executed, results in obtaining business intelligence system data; wherein execution of the identified data operation includes at least one of generating and retrieving the business intelligence system data;

generate a plurality of data operation recommendations including a recommendation for executing the identified data operation;

select at least two data operation recommendations including the recommendation for executing the identified data operation; and send, to a device of the second node, a notification indicating the identified data operation, wherein the device is configured to display a user interface including the identified data operation, wherein the notification indicates the selected at least two data operation recommendations.

10. The system of claim 9, wherein the influence indicator is generated based further on a hierarchical structure including a third plurality of nodes, wherein the hierarchical structure of the third plurality of nodes includes at least one node that is common to the first plurality of nodes and the second plurality of nodes.

11. The system of claim 10, wherein the system is further configured to: generate a primary connections graph based on the hierarchical structure, wherein the first connections graph and the second connections graph are subsets of the primary connections graph.

12. The system of claim 9, wherein the attributes include at least one of: first name, family name, position title, and supervisor identifier.

13. The system of claim 9, wherein the identified data operation includes at least one of: generating a dataset, generating a key performance indicator, generating a report, generating a query, and generating a widget.

14. The system of claim 9, wherein the first node has a connection to at least one first subset node and the second node has a connection to at least one second subset node, each subset node having an access permission, wherein the notification further includes a recommendation to change the access permission of at least one of the at least one second subset node based on the access permission of at least one of the at least one first subset node.

15. The system of claim 9, wherein the notification further includes metadata of the first node.

* * * * *